United States Patent
Post, II et al.

(10) Patent No.: US 8,214,108 B2
(45) Date of Patent: Jul. 3, 2012

(54) VEHICLE SYSTEM AND METHOD FOR SELECTIVELY COUPLED VEHICLES

(75) Inventors: James W. Post, II, Dublin, OH (US); Allen B. Sheldon, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 507 days.

(21) Appl. No.: 12/482,229

(22) Filed: Jun. 10, 2009

(65) Prior Publication Data
US 2010/0318241 A1    Dec. 16, 2010

(51) Int. Cl.
*G05D 1/00* (2006.01)
*G06F 19/00* (2006.01)
(52) U.S. Cl. .................. 701/48; 701/2; 280/400
(58) Field of Classification Search .......... None
See application file for complete search history.

(56) References Cited

U.S. PATENT DOCUMENTS

| | | | |
|---|---|---|---|
| 3,889,770 A | 6/1975 | Herbert | |
| 4,368,793 A | 1/1983 | Igarashi | |
| 4,771,838 A | 9/1988 | Ketcham | |
| 6,039,134 A | 3/2000 | Batanist | |
| 6,282,468 B1 | 8/2001 | Tamura | |
| 6,581,695 B2 * | 6/2003 | Bernhardt et al. | 172/439 |
| 6,640,164 B1 | 10/2003 | Farwell et al. | |
| 7,168,661 B1 * | 1/2007 | Fox | 246/182 R |
| 7,398,137 B2 * | 7/2008 | Ferguson et al. | 700/275 |
| 2002/0163249 A1 * | 11/2002 | Palmer et al. | 303/152 |
| 2005/0060066 A1 * | 3/2005 | Buehler et al. | 701/2 |
| 2007/0282499 A1 | 12/2007 | Maeda et al. | |
| 2009/0012666 A1 * | 1/2009 | Simpson et al. | 701/23 |
| 2010/0049374 A1 * | 2/2010 | Ferrin et al. | 701/1 |
| 2010/0096203 A1 * | 4/2010 | Freese V et al. | 180/167 |

FOREIGN PATENT DOCUMENTS

JP    2008-064036    3/2008

* cited by examiner

*Primary Examiner* — Michael J. Zanelli
(74) *Attorney, Agent, or Firm* — Rankin Hill & Clark LLP

(57) ABSTRACT

A vehicle system and method includes a primary vehicle (PV) and an auxiliary vehicle (AV) selectively connectable to the primary vehicle. The PV and AV vehicles each having an ECU, a propulsion system a braking system, and a directional control system for steering at least one wheel thereon. The ECU of the PV and the ECU of the AV in communication with one another to form an interactive control system that control operation of the systems of the PV and the AV when connected to one another. The vehicle system also includes a docking system for connecting the AV and the PV. The docking system includes an automatic docking actuator that automatically connects the AV to the PV when actuated. Optionally, a remote control device communicates with the ECU of the AV for controlling the AV through the ECU of the AV when disconnected from the PV.

22 Claims, 3 Drawing Sheets

VEHICLE SYSTEM AND METHOD FOR SELECTIVELY COUPLED VEHICLES

BACKGROUND

The present disclosure generally relates to a vehicle system and method for selectively coupled vehicles.

In the state of the art of light duty vehicles, such as sport utility vehicles (SUVs), light trucks, sport activity vehicles (SAVs), crossover utility vehicles (CUVs), pick-up trucks, etc., a robust or sometimes configurable structure is used to haul cargo loads either interior to the vehicle or in a bed of a vehicle, such as an open top load-carrying bed. Many times these vehicles are also used to tow trailers, campers, work machinery, etc. The requirements for the structure, power train, vehicle dynamics, etc., are designed such that they function properly in either the unladen state (usually a driver only with no load or cargo), as well as the fully laden state (e.g., full of passengers with cargo, towing a trailer, etc.).

In the state of the art, the approach is such that the power train, tires, structure, etc., are typically designed for the heaviest loading conditions to allow for a proper margin of safety, utility, etc. However, when such vehicles are operated in the unladen state, the extra weight required for structural integrity in the loaded condition, use of high displacement engines, large tires with heavy construction for load support, etc., do not allow for efficient operation of the vehicle. Furthermore, a large frontal area that often results from a wide track for stability in the laden state, upsizing of steering components, wheel bearings, brakes, etc., further adds to loss in efficiency when driving the vehicle in the unladen state.

Owners of such vehicles purchase them for a wide range of reasons. For example, some owners use the capabilities on a daily basis where they may haul cargo, tow trailers and need the versatility generally on-demand at any time. These owners may not be pleased with the fuel efficiency of the vehicle, but accept this drawback as being necessary to their vehicle lifestyle and/or work requirements.

Other owners purchase these types of vehicles on the basis of needing utility for occasional family trips, the occasional trip to a home improvement store or similar, etc., and use the full utility of the vehicle only on an infrequent basis. However, these owners may use the vehicles to commute to work on a daily basis; hence, operating them in a state of low efficiency. More particularly, these owners are hauling around extra weight, extra vehicle hardware capability, extra size, etc., on a daily basis (e.g., daily commuting) solely for the benefit of only an occasional use of the cargo and towing capability of the vehicle.

More recently, perhaps due to the shortening of fossil fuel reserves and/or other concerns, requirements on efficiency, environmental conservation, etc., vehicle owners are downsizing to smaller and smaller vehicles. Some owners are even purchasing a small commuter car to handle daily travel, while keeping their large utility vehicle at home or only driving small distances during the week. These owners still use the larger utility vehicle on weekends for recreation, travel, etc. as they have previously done, but now own two vehicles for the daily efficiency gains. Such two vehicle ownership may not be financially feasible for many families and owners. Other owners are buying CUVs that often have reduced capabilities, but some increases in efficiency. These types of vehicles can offer a more economical and environmentally improved transport, but usually lack the full capability that many owners have grown to appreciate. In some cases, the improvements in efficiency are not well balanced with the reductions in utility, or vice versa, depending on the vehicle concept and equipment.

Furthermore, the advancement of high efficiency vehicles and powertrains is making significant advancements in the automotive sector. More regular appearance of electric hybrid vehicles, fuel cell vehicles and the more general use of smaller vehicles with less powerful engines, are becoming more and more normal, particularly for North American users who have heretofore rejected such changes. However, one issue with the current state of technology is that these efficient concepts for powertrains are not linearly scalable to larger vehicles (i.e., hybrid systems for large SUVs, pickup trucks, and CUVs do not have the same effective efficiency as when applied in smaller vehicles). Therefore, even with this high efficiency technology, the application of hybrid systems, etc., to larger vehicles is not becoming mainstream at present.

Many vehicle owners value the flexibility and utility that they can get from the class of light trucks, SUVs, CUVs, etc. In the state of the art, it is possible to connect trailers to small, efficient vehicles to haul additional loads; however, the hauling capability is limited as these small vehicles often do not have the structure, powertrain torque, braking system, etc., that would be needed to operate safely and with little user capability to offer the same level of utility as current, large vehicles.

SUMMARY

According to one aspect, a vehicle system is provided for selectively coupled vehicles. More particularly, in accordance with this aspect, the vehicle system includes a primary vehicle (PV) having a propulsion system, a braking system, and a directional control system for controlling steering of at least one steerable wheel of the PV. The vehicle system also includes an auxiliary vehicle (AV) having a propulsion system, a braking system, and a directional control system for controlling steering of at least one steerable wheel of the AV. The AV is selectively connectable to the PV for operation as a combined vehicle. The vehicle system further includes an interactive control system for cooperatively controlling the propulsion systems, the braking systems, and the directional control systems of the PV and the AV. The interactive control system includes a PV ECU on the PV and an AV ECU on the AV that are in communication with one another. The vehicle system additionally includes the docking system for mechanically coupling the AV selectively to the PV while allowing limited relative movement between the PV and the AV. The docking system includes an automatic docking actuator (ADA) that initiates automatic docking of the AV with the PV through the interactive control system to couple the AV to the PV when actuated.

According to another aspect, a vehicle system is provided. More particularly, in accordance with this aspect, the vehicle system includes a primary vehicle (PV) and an auxiliary vehicle (AV) selectively connectable to the primary vehicle. The PV and AV vehicles each have an ECU, a propulsion system, a braking system and a directional control system for steering at least one wheel thereon. The ECU of the PV and the ECU of the AV are in communication with one another to form an interactive control system that controls operation of the systems of the PV and the AV when connected to one another. The vehicle system further includes a docking system for connecting the AV and the PV. The docking system includes an automatic docking actuator that automatically connects the AV to the PV when actuated.

According to still another aspect, a vehicle control system is provided. More particularly, in accordance with this aspect, the vehicle control system includes an auxiliary vehicle (AV) and a remote control device. The AV has an ECU, a propulsion system, a braking system, and a directional control system for controlling steering of at least steerable wheel thereon. The AV is selectively coupled to a primary vehicle (PV) for operation as a combined vehicle. The remote control device communicates with the ECU of the AV for controlling the AV through the ECU when the AV is decoupled from the PV.

According to a further aspect, a method is provided for selectively coupling an auxiliary vehicle to a primary vehicle. Each of the auxiliary vehicle and the primary vehicle includes a propulsion system, a braking system, a directional control system and an ECU. The ECUs of the primary and auxiliary vehicles communicate with one another to form an interactive control system that controls operation of the systems of the primary and auxiliary vehicles. In the method, an automatic docking actuator disposed on at least one of the auxiliary vehicle or the primary vehicle is actuated to initiate automatic docking of the auxiliary vehicle with the primary vehicle. The auxiliary vehicle is propelled and steered by the interactive control system to couple the auxiliary vehicle to the primary vehicle when automatic docking is initiated. The auxiliary vehicle is coupled to the primary vehicle and limited relative movement between the vehicles is allowed over a specified range of motion.

DETAILED DESCRIPTION

Figure 1:
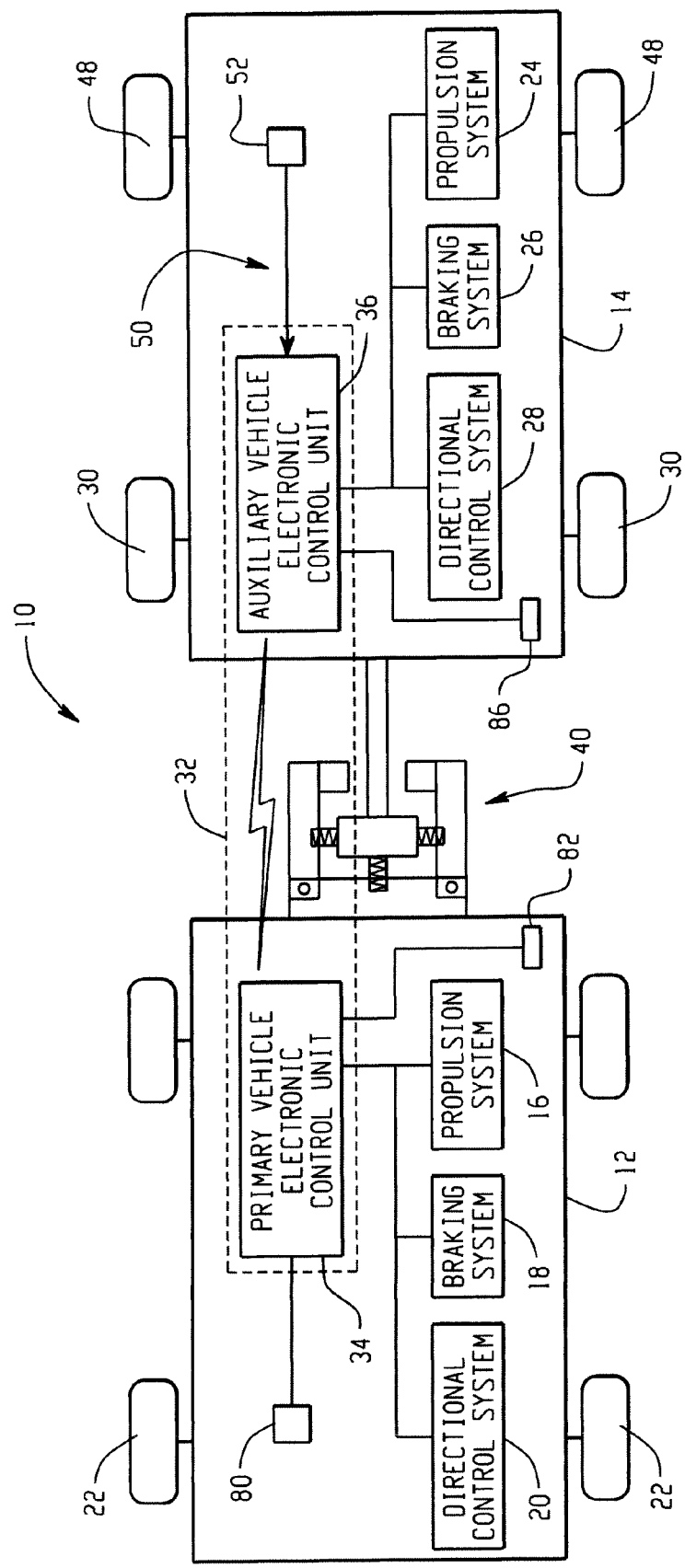
FIG. 1 schematically illustrates a vehicle system for selectively coupling an auxiliary vehicle to a primary vehicle.

Referring now the drawings, wherein the showings are only for purposes of illustrating one or more exemplary embodiments, FIG. 1 schematically illustrates a vehicle system 10 for selectively coupled vehicles, such as the illustrated primary vehicle (PV) 12 and auxiliary vehicle (AV) 14. As shown, the primary vehicle 12 can have a propulsion system 16, a braking system 18 and a directional control system 20 for controlling steering of at least one steerable wheel of the primary vehicle 12 (e.g., wheel 22). Similarly, in the illustrated embodiment, the auxiliary vehicle 14 has its own propulsion system 24, braking system 26 and directional control system 28 for controlling steering of at least one steerable wheel of the auxiliary vehicle 14 (e.g., wheels 30). Alternatively, the auxiliary vehicle 14 could have only one of these systems 24,26,28 or any combination of only two of these systems (e.g., only propulsion system 24 and braking system 26, as might occur if the auxiliary vehicle 14 did not include any steerable wheels. As will be described in more detail below, the auxiliary vehicle 14 is selectively connectable or couplable to the primary vehicle 12 for operation as a combined vehicle 12, 14. The schematically illustrated auxiliary vehicle 14 is shown having four wheels, including steerable wheels 30 (which alternatively could be non-steerable) and rear wheels 48; however, other configurations can be employed (e.g., more or fewer wheels can be included on the auxiliary vehicle 14).

In particular, the vehicle system 10 additionally includes an interactive control system 32 for cooperatively controlling the propulsion systems 16, 24, the braking systems 18, 26, and the directional control systems 20, 28 of the primary vehicle 12 and the auxiliary vehicle 14. In the illustrated embodiment, the interactive control system 32 includes a PV electronic control unit (ECU) 34 on the primary vehicle 12 and an AV ECU 36 on the auxiliary vehicle 14, the ECUs 34, 36 being in communication with one another when the auxiliary vehicle 14 is coupled to the primary vehicle and the vehicles 12, 14 are operating as a combined vehicle. The vehicle system 10 further includes a docking system 40, also referred to herein as a failsafe mechanism, for mechanically coupling the auxiliary vehicle 14 to the primary vehicle 12 while allowing limited relative movement between the primary vehicle 12 and the auxiliary vehicle 14.

As will be described in more detail below, the auxiliary vehicle 14 can have at least two different modes of operation: connected to the primary vehicle 12 through the docking system 40, and independently operated, such as via remote control operation through a hand-held remote control device 46 (FIG. 3) or a remotely located control room or station 56 (e.g., a stationary control room or one provided within another mobile vehicle) with a transmitter and receiver. The interactive control system 32, which comprises the AV ECU 34 on the primary vehicle and the PV ECU 36 on the auxiliary vehicle, enables the auxiliary vehicle 14 to follow closely behind the primary vehicle 12. Thus, through the interactive control system 32, the ECUs 34, 36 communicate with one another and work together to provide an entire "system train" characteristic that, with respect to the operator of the primary vehicle 12, is similar in dynamic performance as the primary vehicle 12 itself operating without attachment to the auxiliary vehicle 14. Such dynamic performance is possible due to the auxiliary vehicle 14 having its own propulsion, braking, and directional control systems 24, 26, 28, which can be operated so as to minimize the impact to the primary vehicle 12 as the auxiliary vehicle 14 follows closely behind.

As will also be described in more detail below, the docking system 40 includes a linkage between the auxiliary vehicle 14 and the primary vehicle 12 that, when coupled together, allows the limited relative movement therebetween. In particular, the limited allowed relative movement transfers minimal forces (e.g., inertial forces) between the primary vehicle 12 and the auxiliary vehicle 14 over a specified range of motion and transfers direct forces (e.g., all forces) between the primary vehicle 12 and the auxiliary vehicle 14 outside the specified range of motion. By this arrangement, the docking system 40 allows the auxiliary vehicle 14 to follow the primary vehicle 12 and be controlled by the interactive control system 32 such that the auxiliary vehicle 14 remains within a defined space (i.e., the specified range of motion) and when within such defined space creates a minimal impact to the dynamic driving behavior of the primary vehicle 12, which allows the entire train (i.e., the auxiliary vehicle 14 coupled to the primary vehicle 12) to be used easily by an unskilled driver. When the auxiliary vehicle 14 departs outside the specified space, the connection or docking system 40 provides for direct force transfer between the vehicles 12, 14.

In the event of a failure of the control system 32 to effectively control the systems 24,26, 28 of the auxiliary vehicle 14 and thus driving of the auxiliary vehicle 14, the auxiliary vehicle 14 can be safely and effectively "towed" behind the primary vehicle 12 for a specified distance or period of time. In this mode, which can be referred to as a failsafe mode, the primary vehicle 12, through the interactive control system 32, can recognize the condition of the failed control system and can limit the dynamic performance of the primary vehicle 12 and actively assist the driver thereof in operation of the auxiliary vehicle 14 until proper repair of the system can be carried out. For example, the interactive control system 32 can limit operation of the propulsion system 16, the braking system 18, and/or the directional control system 20 in the event of a failure of the docking system 40 or control thereof.

The propulsion systems 16, 24, respectively on the primary vehicle 12 and the auxiliary vehicle 14, can be a conventional gasoline engine and fuel system, an electric motor, a hybrid gas/electrical system or some other propulsion system. In addition to the propulsion system 16 of the primary vehicle 12 being self starting, the propulsion system 24 of the auxiliary vehicle 14 can also be self starting, e.g., either by a signal from the PV ECU 34 or via a signal from the remote control device 46 (or remote control station 56). The powertrain unit (not shown) for transferring power from the propulsion system 24 to one or more of the wheels 30, 48 of the auxiliary vehicle 14 can be sized so as to provide the auxiliary vehicle 14 acceleration performance in accordance with whatever requirements are necessary for following the primary vehicle 12 at minimal influence on the primary vehicle. In one embodiment, the propulsion system 24 is capable of providing both forward and reverse propulsion. Optionally, the state of health of the propulsion system 24 and its associated powertrain system can be monitored by the PV ECU 36 alone or in combination with the AV ECU 34 of the primary vehicle 12, the remote control device 46 and/or the remote control station 56.

The braking systems 18, 26 can be standard hydraulic systems (e.g., booster with lines, failsafe, etc.) optionally in combination with a controlled actuator (not shown) to press the booster. The vehicles 12, 14 can additionally include traction control systems and/or vehicle stability assist systems for assisting the level of dynamic performance of the vehicles 12, 14, and particularly to assist in the level of dynamic performance of the auxiliary vehicle 14 such that it is compatible with a large range of primary vehicles 12; though such systems are not required. In addition, brake-by-wire systems or other systems can be employed to provide a suitable level of dynamic performance to the auxiliary vehicle 14; though those too are not required.

The directional control system 28 of the auxiliary vehicle 14 can be fitted to meet the requirements of robust following of the auxiliary vehicle 14 behind the primary vehicle 12, as well as operation through the remote control device 46 and/or remote control station or room 56. In one embodiment, a large steering rotation capability is provided on one or more of the wheels (e.g., steerable wheels 30) such that tight cornering of the auxiliary vehicle 14 at low speeds and/or within confined spaces can be achieved. In the same or another embodiment, a steer-by-wire system is employed, which works in coordination with the AV ECU 36, the interactive control system 32, the remote control device 46 and/or the remotely located control station or room 56. Optionally, the auxiliary vehicle 14 can be fitted with a load sensing system 50 that senses a load condition of the auxiliary vehicle 14. The load condition can be a load level of the auxiliary vehicle 14 and/or a metric relating to the distribution of cargo within the auxiliary vehicle 14.

In one embodiment, the load sensing or detection system 50 includes a load condition sensor 52 that senses a load level and/or load distribution metric within the auxiliary vehicle 14 and sends a signal representative thereof to the AV ECU 36 and thus the interactive control system 32. If desired, the load detection system 50 can be capable of providing real-time information to the user while load is being added to the auxiliary vehicle 14. With such functionality, it is possible to use algorithms to detect improper loading of the auxiliary vehicle 14 and provide instructions of load redistribution to the operator and/or warnings about the state of loading of the auxiliary vehicle 14. In addition, the load sensing system 50 can provide information to the interactive control system 32 so that it is able to properly adapt the propulsion systems 16, 24, braking systems 18, 26 and/or directional control systems 20, 28 of the vehicles 12, 14 to better control the vehicles in view of a detected load state. Specifically, load state information can be shared with the primary vehicle 12 through the interactive control system 32 so as to further enhance the operation ease, reliability and/or safety of the combined vehicles 12, 14 under all states of operation. Still further, load state information can be shared with the remote control device 46 for purposes of informing a remote user of the performance characteristics of the auxiliary vehicle 14, such as when operated in the remote control mode. Still further, in lieu of a single load sensor, 52, an array of sensors can be used to detect the loaded state or metric of load distribution. In addition, or in the alternative, sensors used as part of the PS, BS and DCS of the AV (24, 26 and 28 respectively) may also be used to determine the load state and or loading distribution.

Figure 2:
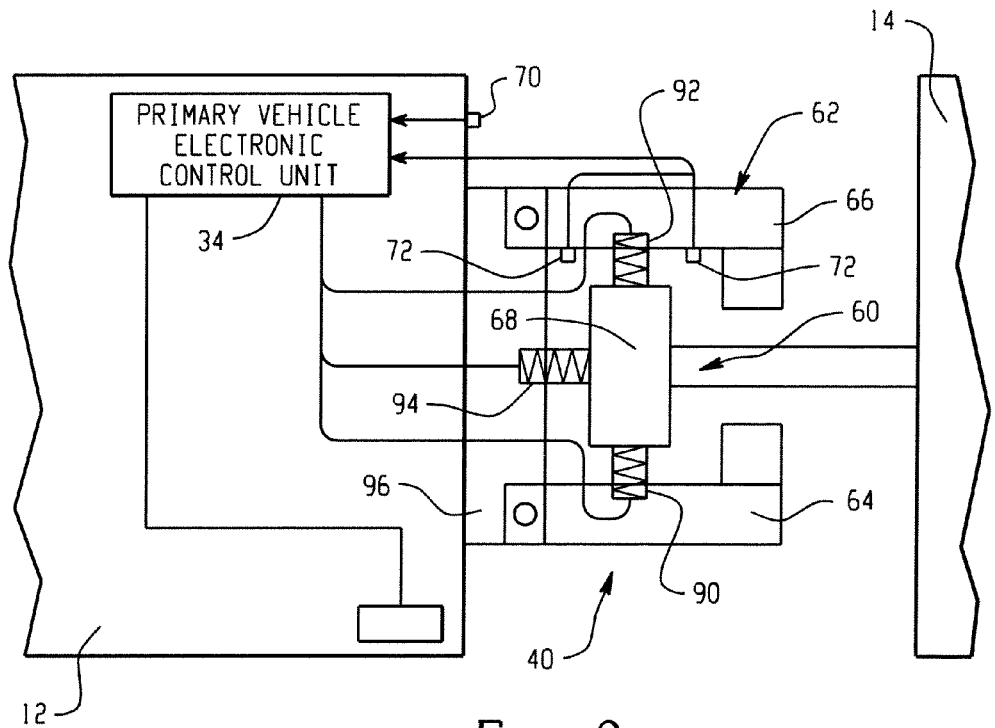
FIG. 2 is a partial enlarged schematic view of a docking system of the vehicle system of FIG. 1 for selectively coupling the auxiliary vehicle to the primary vehicle.
Figure 4:
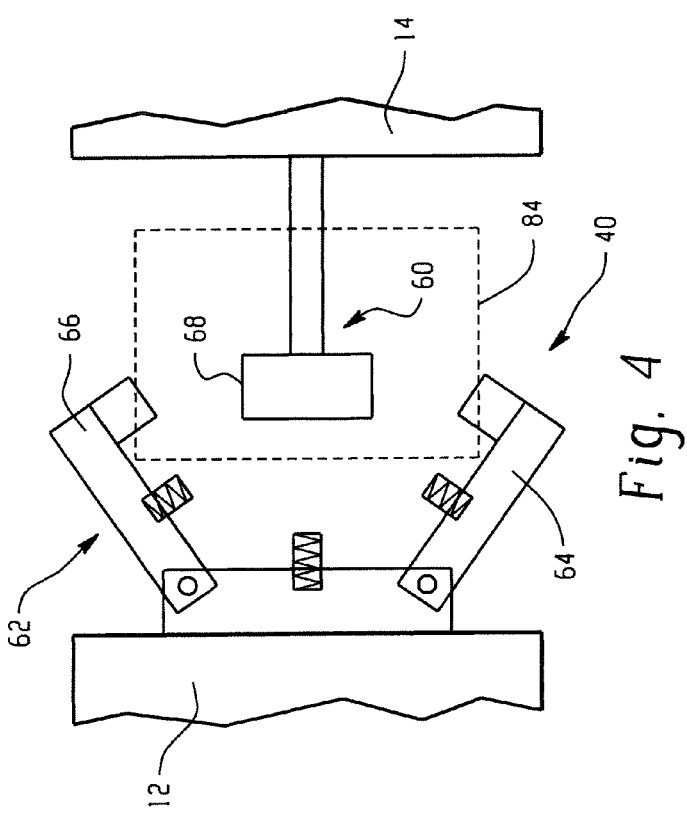
FIG. 4 is another partial enlarged schematic view of the docking system shown with the auxiliary vehicle decoupled from the primary vehicle.

With reference to FIG. 2, the docking system 40 can include a coupling element 60 provided at a forward end of the auxiliary vehicle 14 and the coupling mechanism 62 provided at the rearward end of the primary vehicle 12. In the illustrated embodiment, the coupling mechanism 62 includes a pair of opposed arm members 64, 66 pivotally mounted to the primary vehicle 12 for selective coupling to an enlarged distal end portion 68 of the coupling element 60. The arms 64, 66 are pivotable to open positions shown in FIG. 4 to allow decoupling of the auxiliary vehicle 14 from the primary vehicle 12. It should be appreciated and understood that other docking system configurations can be employed for selectively coupling the auxiliary vehicle 14 to the primary vehicle 12 as described herein. As already indicated, the docking system 40 can permit relative motion of the auxiliary vehicle 14 relative to the primary vehicle 12 within a specified range of motion, and can provide a mechanical linkage (which can serve a failsafe function) when the auxiliary vehicle is outside the specified range. The docking system 40 can have features in its instruction to allow for a difference in the constraint between the primary vehicle 12 and the auxiliary vehicle 14 depending on the operational status (e.g., loading, vehicle speed, etc.) and to assist the mechanical properties between the primary vehicle 12 and the auxiliary vehicle 14 in the event of a given failure mode.

The AV ECU 36 of the auxiliary vehicle 14 can manage various functions of the auxiliary vehicle 14, including control of the propulsion system 24, the braking system 26, the directional control system 28, and the load sensing system 50. While shown schematically as a single centralized control unit, the AV ECU 36 can be a distributed control system employing any number of controllers distributed on the vehicle 14 for controlling the various systems of the auxiliary vehicle 14. Although not shown, additional externally or internally mounted sensors can be provided on the auxiliary vehicle 14 for measuring various vehicle state parameters, such as yaw rate, lateral acceleration, vehicle speed, etc.

These sensors can be operatively connected to the AV ECU 36 for providing appropriate signals thereto.

As shown in FIG. 2, one or more distance sensors 70 can be included in the docking system 40 or adjacent thereto to provide feedback (e.g., radio, proximity, radar, etc.) of the relative distance and/or position of the auxiliary vehicle 14 to the primary vehicle 12. Alternatively, or in addition, distance sensors could be provided on the auxiliary vehicle 14 to provide feedback of the relative position of the primary vehicle 12 relative to the auxiliary vehicle 14. Such sensors, including distance sensor 70, can provide appropriate signals to respective ECUs, such as ECU 34 of the primary vehicle 12. The docking system can also include one or more proximity sensors 72 for indicating the relative position of the auxiliary vehicle 14 from the primary vehicle 12 to the interactive control system 32, such as by monitoring the position of the distal end portion 68 relative to the coupling mechanism 62.

Figure 3:
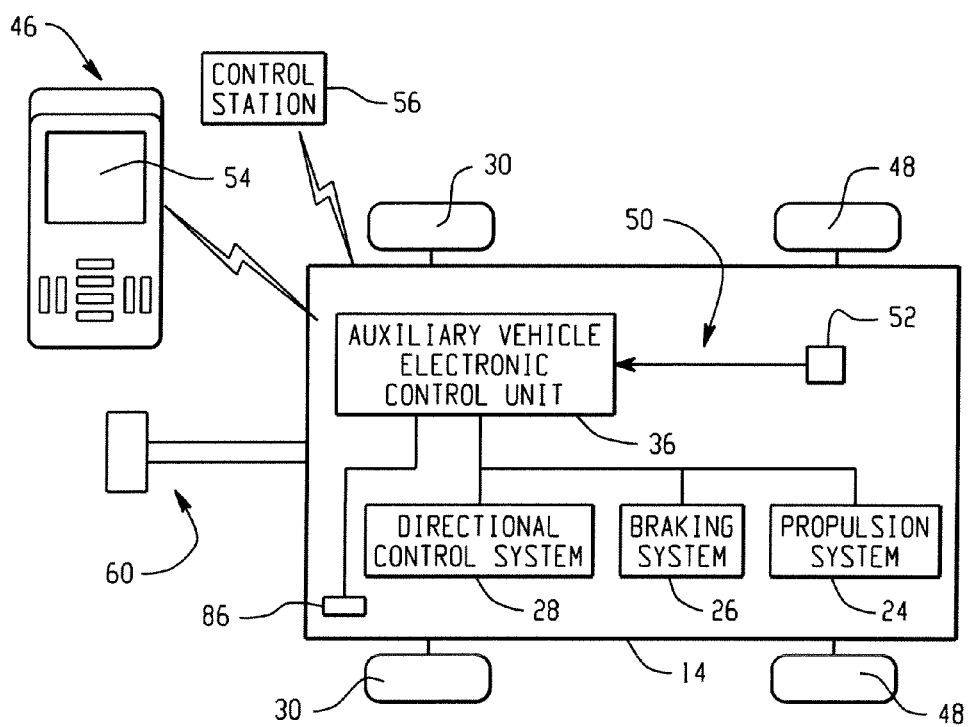
FIG. 3 schematically illustrates a remote control device communicating with the auxiliary vehicle for control thereof.

With reference to FIG. 3, the vehicle system 10 can optionally include remote control device 46 that communicates with the AV ECU 36 and selectively controls the auxiliary vehicle 14 through the ECU 36 when the auxiliary vehicle 14 is decoupled from the primary vehicle 12. In particular, the remote control device 46 can be used to operate the auxiliary vehicle 14 in a remote control state. The device 46 can have a conventional interface as is known and understood by those skilled in the art. For example, the remote control device 46 can include a display 54 for displaying information about the auxiliary vehicle 14. The remote control device 46 can allow for sending and/or receiving of information about the auxiliary vehicle 14, as well as transmission of user control signals or instructions to the auxiliary vehicle 14 for maneuvering the vehicle 14. In one embodiment, the display 54 of the remote control device 46 provides feedback about the state of operation of the auxiliary vehicle 14, such as remaining fuel load, warning lights related to critical systems, etc.

The remote control device 46 can be light and small enough so as to be storable easily within the auxiliary vehicle 14 or in any number of primary vehicles, such as primary vehicle 12, which are compatible to work in conjunction with the auxiliary vehicle 14. Due at least in part to the auxiliary vehicle 14 having its own propulsion system 24, brake system 26, and directional control system 28, the vehicle 14 can be utilized in a completely separated state from the primary vehicle 12 (e.g., controlled by the remote control device 46). The remote control device 46 can alternatively be an external control pad disposed on a static or movable structure, e.g., the primary vehicle 12, instead of or in addition to the illustrated hand-held remote control device 46 of FIG. 3. Optionally, the auxiliary vehicle 14 can be used independently as an auxiliary power generator for providing electricity to, for example, work machines, hand tools, etc. Furthermore, remote control can be carried out via communication between the AV ECU 34 and the remotely located control room or station 56 which can operate under the same principles of the hand-held remote device 46.

The PV ECU 34 of the primary vehicle 12 can manage various functions of the primary vehicle 12, including control of the propulsion system 16, the braking system 18, and the directional control system 20. While shown schematically as a single centralized control unit, the ECU 34 can be a distributed control system employing any number of controllers distributed on the vehicle 12 for controlling the various systems of the primary vehicle 12. For example, the PV ECU 34 could include a powertrain controller, a braking controller, a chassis controller (i.e., for controlling steering, ride height, DMV, etc.), etc. Such controllers could employ an interface or interfaces to allow transmission of demand signals between the controllers for allowing integrated function of control. Examples of such control could allow for engine torque reduction (i.e., traction control, cruise control, etc.), brake torque application (i.e., electronic stability control), height control (e.g., leveling systems, etc.), etc. The PV ECU 34 can additionally house logic and diagnostics for coordination of the auxiliary vehicle 14 with the lead vehicle 12. In addition, the ECU 34 can allow for interactive operation with an operator of the primary vehicle 12 when in the primary vehicle 12 to provide information such as the diagnostic status of both the primary vehicle 12 and the PV ECU 34. For this purpose, the PV ECU 34 can be connected to a user interface 80 that can be a touch screen user interface, for example. AV ECU 36 could be in communication with the primary vehicle 12, and particularly the PV ECU 34, via radio or other means so as to be able to transmit/receive status and instructions from the primary vehicle 12 for the overall coordinated control of the two vehicles 12, 14. Having this communication capability, the ECUs 34 and 36 through the interface 80 could inform the driver of the primary vehicle 12 of the fuel load of the auxiliary vehicle 14, any change in the state of loading of the auxiliary vehicle 14, etc. so as to provide a warning to the operator regarding safety or impending loss of function.

In one embodiment, not shown, an add-on controller is connected to the electronic infrastructure of the primary vehicle 12 so as to interface with the existing network of usable controllers on the primary vehicle 12. Such an add-on interface could be a stand-alone device, such as commonly used in navigation systems that mount in the interior of the vehicle or could be integrated into an existing instrument panel system, such as on-board diagnostics, integrated navigation systems with screens, etc. The interface could be connected to the vehicle CAN (controller area network) or equivalent system. In addition, it could provide power and connection to any vehicle proximity sensors (e.g., sensors 70 or 72) that work in coordination with the auxiliary vehicle 14. The add-on controller could house logic and diagnostics for coordination of the auxiliary vehicle 14 with the primary vehicle 12. In addition, the control unit for the auxiliary vehicle 14 could allow for interactive operation with the operator while in the primary vehicle 12 to provide information such as the diagnostic status of both the primary vehicle 12 and the interactive control system 32. Still further, such a control unit could be capable of providing feedback to the operator regarding the mode of operation of the auxiliary vehicle 14 as it pertains to the primary vehicle 12, including, for example, confirmation of connection/disconnection, during driving on roads, etc.

The docking system 40 for connecting the auxiliary vehicle 14 and the primary vehicle 12 can include an automatic docking actuator (ADA) that initiates automatic docking of the auxiliary vehicle 14 with the primary vehicle 12 through the interactive control system 32 to couple the auxiliary vehicle to the primary vehicle when actuated. The automatic docking actuator can be a button that is disposed on at least one of the primary vehicle 12 (e.g., button actuator 82) or the auxiliary vehicle 14 (e.g., button actuator 86) that is actuated by depression thereof. In one embodiment, with reference to FIG. 4, the automatic docking occurs only upon actuation of the automatic docking actuator 82 or 86 when the auxiliary vehicle 14 is in at least one predetermined position relative to the primary vehicle 12. In the illustrated embodiment, the at least one predetermined position relative to the primary vehicle 12 can be any position wherein the distal end portion 68 of the coupling element 60 of the auxiliary vehicle 14 is located within window of space 84 which is fixed relative to the primary vehicle 12 or more particularly, for example, fixed relative to the pivoted open arms 64, 66 of the coupling mechanism 62 of the primary vehicle 12. Accordingly, when the auxiliary vehicle 14 is positioned such that the distal end portion 68 is within the window 84, the auxiliary vehicle 14 can automatically dock to the primary vehicle 12 via "one touch operation" of the automatic docking actuator 82 (or 86).

While the automatic docking actuator 82 is shown positioned on the primary vehicle 12, a second automatic docking actuator 86 can be provided on the auxiliary vehicle 14 in addition to or instead of the actuator 82. Another automatic docking actuator could be provided or actuated through the remote control device 46 if desired. During automatic docking or attempted automatic docking, the interface 80 and/or the hand-held remote 46 can provide feedback to the operator with sufficient information to judge whether or not the vehicles 12, 14 can be joined through the docking system 40. This can include information about road inclination, differences in spatial orientation between the auxiliary vehicle 14 and the primary vehicle 12, potentially any obstructions between the two vehicles 12, 14 that would prohibit safe and reliable joining, etc. In addition, diagnostics of the vehicles 12, 14 can be performed in advance of the docking operation so as to inform the operator as to whether or not the vehicles can be joined and/or be operated together after docking. Upon confirmation of the appropriate conditions to permit the self-docking, the user can dock the vehicles 12, 14 together by following the instructions provided either by the ECU 34 on the interface 80 or the remote device 46.

During the docking operation, the interactive control system 32 can control the auxiliary vehicle 14 such that the auxiliary vehicle 14 is propelled through its propulsion system 24 and steered through its directional control system 28 to move the auxiliary vehicle 14 into a docking relation with the primary vehicle 12 when the automatic docking actuator 82 or 86 is actuated and the auxiliary vehicle 14 is in the at least one predetermined position (i.e., portion 68 is within window 84). In particular, the auxiliary vehicle 14 is able to propel and guide itself to the primary vehicle 12 and autonomously connect. In the illustrated embodiment, this includes capturing the distal portion 68 by the arms 64, 66 pivoting toward one another. Through sensors, such as sensor 70 and/or sensors 72, the docking system 40 is capable of sensing or judging the status of the linkage between the vehicles 12, 14 and providing feedback to the operator, including an indication as to whether or not the vehicles 12, 14 are correctly docked. If the vehicles 12, 14 are unable to dock, the ECU 34 through the interface 80 and/or the remote device 46 can provide specific diagnostic instructions so as to lead the operator to dock the vehicles 12, 14. In the event that the self-docking cannot be performed by the control operation of the two vehicles 12, 14, the auxiliary vehicle 14 can have a back-up docking mode which enables the operator to either maneuver the lead vehicle 12 to the auxiliary vehicle 14 or maneuver the auxiliary vehicle 14 to the lead vehicle 12 via the hand-held remote control device 46 and connect the vehicles manually (e.g., secure the arms 64, 66 about the distal portion 68), and optionally provide a method of confirmation of proper joining in the manual docking mode.

Undocking of the vehicles 12, 14 can be controlled similarly to the docking and coupling operation, but in the reverse order. Again, an automated mode of undocking can be initiated, such as through one of the actuators 82, 86, the interface 80 in the primary vehicle 12 and/or the remote control device 46. Prerequisite conditions for undocking can be sensed prior to the procedure, and feedback can be provided to the operator as in the docking operation. An additional prerequisite for the undocking might require information or sensing of surrounding terrain and/or obstructions that would permit safe and controllable undocking. Additional failsafe modes and detection could be in place so as to only allow a specified rate of undocking, etc., to avoid any injury of surrounding property and/or humans and animals in the vicinity.

By this arrangement, the mobility capability of hauling and managing load can be employed as a part time function as needed by the owner. The auxiliary vehicle 14 can be easily detached from the primary vehicle 12 with minimum owner interaction, such as by the press of button actuator 82 or 86. The auxiliary vehicle 14 can also be reconnected to the primary vehicle 12 in a similarly, easy manner. This ease of disconnect and reconnect allows for simple operation.

Once properly docked, the auxiliary vehicle 14 through the ECU 36 is transformed to a mode where it can follow the primary vehicle 12 with minimal impact on the operation of the primary vehicle. In particular, the interactive control system 32 controls the propulsion system 24, the braking system 26 and the directional control system 28 of the auxiliary vehicle 14 to minimize reliance on the mechanical coupling of the docking system 40 and thereby minimize performance impact on the primary vehicle 12. This can be done by a combination of feedback control of the sensed proximity of the auxiliary vehicle 14 with respect to the primary vehicle 12 (e.g., sensed by the sensors 70 and 72) as well as following the same path trajectory of the primary vehicle 12 depending on the operating speed, lateral acceleration, etc. of the primary vehicle. It may also be considered that forces in the docking system components (such as from sensors in the coupling element 60) may be used as inputs to realize or refine the proximity control between the primary vehicle 12 and the auxiliary vehicle 14.

In particular, a centralized control strategy can be employed on both the auxiliary vehicle 14 and the primary vehicle 12 through the interactive control system 32. In this co-dependent control operation, both vehicles 12, 14 can share information between their respective ECUs 34, 36 about their current state of motion and intended actions. Intended actions of the driver in the primary vehicle 12 can include steering input, brake input, accelerator, gear position, operational conditions of the drivetrain (e.g., downshift command), throttle position, etc. These intended actions can be examined by the interactive control system 32 and used in an anticipatory manner that better enhances the robustness of the proximity and path feedback algorithms that coordinate the motion of the primary vehicle 12 with motion of the auxiliary vehicle 14. Further, such anticipatory information can allow the auxiliary vehicle 14 to anticipate abrupt braking, accelerating, steering behavior, etc., of the primary vehicle 12 so as to take appropriate action to minimize proximity error and path deviation targets. Further, proper interpretation of the driver's input can lead to states of intervention of the systems of the primary vehicle 12 to avoid any undesired deviation in a proximity error and/or path tracking error.

Co-dependent operation of the vehicles 12, 14 can be dependent on a variety of operational conditions, including, for example, vehicle speed, navigational information, etc. Through the interactive control system 32, the vehicles 12, 14 in their coupled condition can understand the abilities of one another and cooperate according to this information. That is, the ECU 34 of the primary vehicle 12 and the ECU 36 of the auxiliary vehicle 14 remain in communication with one another to form the interactive control system 32 that controls operation of the systems of the vehicles 12, 14 when connected to one another.

Specific modes of operation, such as driving at low speed between narrow constraints (e.g., into an out of a garage or narrow street) can either be sensed by the interactive control system 32 or provided by the driver as input to the ECU 34 of the primary vehicle 12. In such instances, the priority or strategy of either the proximity feedback control or path deviation control can be modified accordingly to provide optimal functioning to the vehicles 12 and 14. In low speed modes, it can be possible that the proximity control would be relaxed so as to allow the primary vehicle 12 and the auxiliary vehicle 14 to operate with "normal trailer" operational dynamics, hence allowing more tactile feel in conventional operation for the combined vehicle train 12, 14.

For reverse operation (i.e., backing up), the reverse gear position of the transmission of the primary vehicle 12 can be detected and transmitted to the auxiliary vehicle 14 such that it can change its propulsion direction through its own drivetrain, and can be used to switch control strategy of the combined train 12, 14 to provide enhanced maneuverability.

The limited relative movement allowed between the primary vehicle 12 and the auxiliary vehicle 14 can be variably controlled by the interactive control system 32. For example, in the illustrated embodiment, variably adjustable shock absorbers 90, 92, 94 can be provided on one or both of the coupling element 60 and the coupling mechanism 62. Specifically, in the illustrated embodiment, shock absorbers 90, 92 are disposed on the movable arms 64, 66 and shock absorber 94 is disposed on a base 96 of the coupling mechanism 62. When the arms 64, 66 are closed about the coupling element portion 68, the shock absorbers 90,92,94 can cooperatively engage the distal end portion 68. The variable state of the shock absorbers 90,92,94 can be controlled by the interactive control system 32 through the PV ECU 34. In one embodiment, the variably controlled relative movement of the auxiliary vehicle 14 relative to the primary vehicle 12 is controlled by adjusting the variable shock absorbers 90,92, 94. For example, variably controlled relative movement can be varied in accordance with speed and/or loading of one or both of the primary vehicle 12 or the auxiliary vehicle 14. Through the variably adjustable shock absorbers 90,92,94, the docking system 40 can allow limited relative movement of the auxiliary vehicle 14 within a predefined range of motion wherein limited forces are transferred between the auxiliary vehicle 14 and the primary vehicle 12 via the shock absorbers 90,92,94, while simultaneously the docking system 40 continuously mechanically connects the auxiliary vehicle 14 to the primary vehicle 12 such that direct forces are transferred between the auxiliary vehicle 14 and the primary vehicle 12 when movement occurs outside the predefined range of motion.

In one embodiment, the interactive control system 32 controls the vehicles 12, 14 in a failure mode where one or both of the vehicles 12, 14 are operated under a reduced function mode or a failure function mode. For example, should full loss of power occur in the auxiliary vehicle 14, the lead vehicle 12 or both simultaneously, the mechanical linkage provided by the docking system 40 between the auxiliary vehicle 14 and the primary vehicle 12 can be adjusted so as to provide sufficient ability to hold the vehicles 12, 14 together and have stable and easily controllable directional response which enables movement of the combined vehicles 12, 14. For example, such a failure can result in the variable adjustable shock absorbers 90,92,94 stiffening so as to transmit increased forces between the vehicles 12, 14.

In another example, when a particular electrical or mechanical failure occurs within a subsystem of either the primary vehicle 12 and the auxiliary vehicle 14, a failsafe mode of a reduced function state can be commenced. The ECUs 34, 36 can detect such failures through diagnostics systems calculations and provide the user with instructional information in the event of a failure. Information related to such a failure can be displayed either through the interface 80 or the hand-held remote device 46 to assist the driver in operation of the vehicles 12, 14 in their respective reduced states of utility until the vehicles 12, 14 can be serviced.

Figure 5:
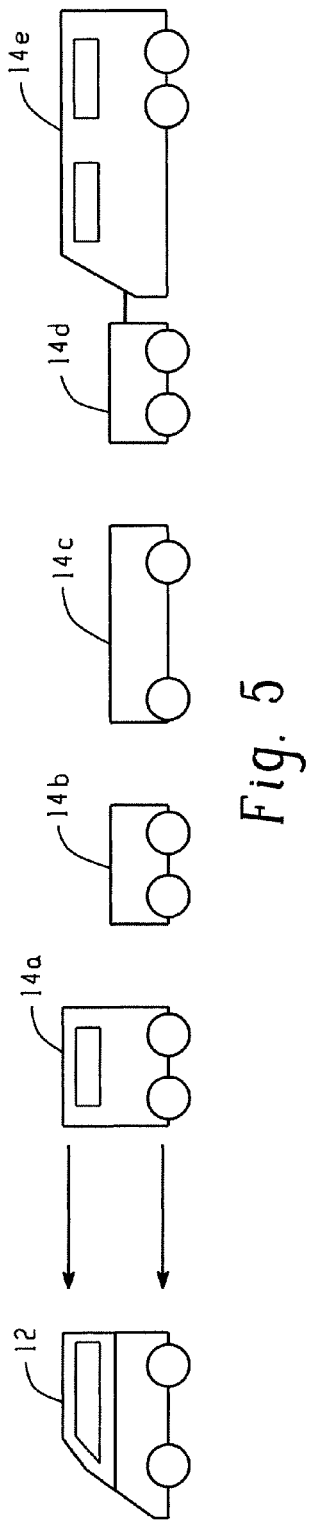
FIG. 5 schematically illustrates an exemplary primary vehicle and a plurality of auxiliary vehicles selectively connectable or couplable to the primary vehicle.

While only a single auxiliary vehicle 14 is illustrated in FIGS. 1-4, it is to be appreciated that a plurality of auxiliary vehicles could be connected to the primary vehicle 12, wherein the auxiliary vehicles each have coupling elements usable for coupling such auxiliary vehicles to the primary vehicle 12 in a docking system similar to docking system 40. By such an arrangement, with reference to FIG. 5, the primary vehicle 12 could be a vehicle selected based on particular efficiency requirements of a particular user. For example, the user or buyer could select a small, compact primary vehicle with high fuel efficiency and low utility for daily use based on the user's financial and demographic needs. Alternatively, the primary vehicle 12 could be any other type of vehicle, such as a full-size SUV, pick-up truck, etc., that meets the needs of the user's efficiency state. As shown in FIG. 5, the auxiliary vehicles could include, for example, illustrated vehicles 14a-14e. By way of further example, auxiliary vehicle 14a can be an auxiliary vehicle that provides a large volume of interior load space for carrying items that need to stay out of the weather and possibly need climatization for protection. Auxiliary vehicle 14b could be a hauling-light vehicle having a small, open top platform that can be loaded to meet the requirements for light duty hauling, such as employed with a short length pick-up truck bed. Auxiliary vehicle 14c could be a hauling-heavy auxiliary vehicle employing the same structural characteristics as the auxiliary vehicle 14b, but having a larger size and structure to handle larger loads and manage bigger objects. Still further, the auxiliary vehicle could be a combined auxiliary vehicle 14d, 14e including a load platform or towing lead vehicle 14d connected to some other vehicle, such as camper 14e.

In operation, any auxiliary vehicle, including auxiliary vehicles 14a-14e, can be configured for connection to the primary vehicle 12. Accordingly, when auxiliary vehicles 14a-14e (or additional auxiliary vehicles) are included in the vehicle system 10, the system 10 includes at least a second auxiliary vehicle (e.g., vehicles 14a-14e) having its own propulsion system, braking system, and a directional control system for controlling steering of at least one steerable wheel of the auxiliary vehicle. The second auxiliary vehicle is selectably couplable to the primary for operation as a combined vehicle together with the primary vehicle.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in common elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. For example, the ECUs 34 and 36 may be implemented as appropriate hardware circuits or alternately as microprocessors programmed to implement their respective functions. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, it will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle system for selectively coupled vehicles, comprising:
a primary vehicle (PV) having a propulsion system (PS), a braking system (BS), and a directional control system (DCS) for controlling steering of at least one steerable wheel of the PV;
an auxiliary vehicle (AV) having a propulsion system (PS), a braking system (BS), and a directional control system (DCS) for controlling steering of at least one steerable wheel of the AV, the AV selectively connectable to the PV for operation as a combined vehicle;
an interactive control system for cooperatively controlling the PS, the BS and the DCS of the PV and the AV, the interactive control system including a PV electronic control unit (ECU) on the PV and an AV ECU on the AV that are in communication with one another; and
a docking system for mechanically coupling the AV selectively to the PV while allowing limited relative movement between the PV and the AV, the docking system including an automatic docking actuator (ADA) that initiates automatic docking of the AV with the PV through the interactive control system to couple the AV to the PV when actuated.

2. The vehicle system of claim 1 wherein automatic docking occurs upon actuation of the automatic docking actuator (ADA) only when the AV is in at least one predetermined position relative to the PV.

3. The vehicle system of claim 2 wherein the interactive control system propels the AV through the AV PS and steers the AV through the AV DCS to move the AV into a docking relation with the PV when the ADA is actuated and the AV is in the at least one predetermined position.

4. The vehicle system of claim 1 wherein the docking system includes one or more proximity sensors for indicating the relative position of the AV from the PV to the interactive control system.

5. The vehicle system of claim 1 wherein the limited relative movement allowed between the PV and AV is variably controlled by the interactive control system.

6. The vehicle system of claim 5 wherein the variably controlled relative movement is varied in accordance with speed or loading of one of the PV or the AV.

7. The vehicle system of claim 1 wherein the AV includes a load sensing system that senses a load condition of the AV, the interactive control system controlling the systems of the AV and the PV in response to the sensed load condition.

8. The vehicle system of claim 7 wherein the load condition is at least one of a load level or a distribution indication corresponding to the distribution of cargo in the AV.

9. The vehicle control system of claim 1 wherein the interactive control system controls the PS, BS and DCS of the AV to minimize reliance on the mechanical coupling of the docking system and thereby minimize performance impact on the PV.

10. The vehicle system of claim 1 wherein the ADA is a button disposed on at least one of the PV or the AV that is activated by depression thereof.

11. The vehicle system of claim 1 further including at least one of:
a remote control device or a remote control room that remotely communicates with the AV ECU and selectively controls the AV through the AV ECU when the AV is decoupled from the PV.

12. The vehicle system of claim 11 wherein the AV ECU communicates with the remote control device and the remote control device includes a display for displaying information about the AV.

13. The vehicle system of claim 1 wherein the docking system includes a linkage between the AV and the PV when coupled together that allows the limited relative movement, the limited relative movement transferring minimal forces between the PV and the AV over a specified range of motion and transferring direct forces between the PV and the AV outside the specified range of motion.

14. The vehicle system of claim 1 wherein the interactive control system includes a failsafe mode that limits operation of the PS, BS and DCS of the PV in the event of a failure of the docking system.

15. The vehicle system of claim 1 further including:
a second AV having a propulsion system, a braking system, and a directional control system for controlling steering of at least one steerable wheel of the AV, the second AV selectively couplable to the PV for operation as a combined vehicle together with the PV, the AV being one of an enclosed climate controlled vehicle, an open top load-carrying bed vehicle, and a larger open top load carrying bed vehicle, the second AV being another of the enclosed climate controlled vehicle, the open top load-carrying bed vehicle and the larger open top load-carrying bed vehicle.

16. A vehicle system comprising:
a primary vehicle (PV) and an auxiliary vehicle (AV) selectively connectable to the primary vehicle, the PV and AV vehicles each having an electronic control unit (ECU), a propulsion system, a braking system and a directional control system for steering at least one wheel thereon, the ECU of the PV and the ECU of the AV in communication with one another to form an interactive control system that controls operation of the systems of the PV and the AV when connected to one another; and
a docking system for connecting the AV and the PV, the docking system including an automatic docking actuator that automatically connects the AV to the PV when actuated.

17. The vehicle system of claim 16 wherein the docking system allows limited relative movement of the AV within a predefined range of motion wherein limited forces are transferred between the AV and the PV and mechanically connects the AV to the PV such that forces are transferred between the AV and PV outside the predefined range of motion.

18. The vehicle system of claim 17 further including:
a remote control device communicating with the ECU of the AV for controlling the AV through the ECU of the AV when disconnected from the PV.

19. The vehicle system of claim 17 further including:
a remote control station communicating with the ECU of the AV for controlling the AV through the ECU of the AV when disconnected from the PV.

20. A vehicle control system, comprising:
an auxiliary vehicle (AV) having an electronic control unit (ECU), a propulsion system, a braking system, and a directional control system for controlling steering of at least one steerable wheel thereon, the AV selectively coupled to a primary vehicle (PV) for operation as a cooperatively controlled combined vehicle; and
a remote control device communicating with the ECU of the AV for controlling the AV through the ECU when the AV is decoupled from the PV.

21. The vehicle control system of claim 20 further including:
a docking system to mechanically couple the AV selectively to the PV, the docking system including an automatic docking actuator (ADA) that initiates automatic docking of the AV and PV.

22. A method for selectively coupling an auxiliary vehicle to a primary vehicle, wherein each of the auxiliary vehicle and the primary vehicle includes a propulsion system, a braking system, a directional control system and an electronic control unit (ECU), the ECUs of the primary and auxiliary vehicles communicating with one another to form an interactive control system that controls operation of the systems of the primary and auxiliary vehicles, the method comprising:

actuating an automatic docking actuator disposed on at least one of the auxiliary vehicle or the primary vehicle to initiate automatic docking of the auxiliary vehicle with the primary vehicle;

propelling and steering the auxiliary vehicle by the interactive control system to couple the auxiliary vehicle to the primary vehicle when automatic docking is initiated; and coupling the auxiliary vehicle to the primary vehicle, wherein limited relative movement between the vehicles is allowed over a specified range of motion.

* * * * *